United States Patent [19]

Yanagihara et al.

[11] 4,178,903
[45] * Dec. 18, 1979

[54] INTERNAL COMBUSTION ENGINE WITH AN AUXILIARY COMBUSTION CHAMBER

[75] Inventors: Hiromichi Yanagihara; Nobuhiro Miura, both of Susono, Japan

[73] Assignee: Toyota Jidosha Kogyo Kabushiki Kaisha, Aichi, Japan

[ * ] Notice: The portion of the term of this patent subsequent to Sep. 26, 1995, has been disclaimed.

[21] Appl. No.: 849,355

[22] Filed: Nov. 7, 1977

[30] Foreign Application Priority Data

Aug. 17, 1977 [JP] Japan ................................ 52/97876

[51] Int. Cl.² ............................ F02B 3/00; F02B 33/02
[52] U.S. Cl. ............................ 123/32 SP; 123/32 ST; 123/119 A
[58] Field of Search ............. 123/32 C, 32 ST, 32 SP, 123/30 D, 191 S, 119 A

[56] References Cited

U.S. PATENT DOCUMENTS

| | | | |
|---|---|---|---|
| 3,875,909 | 4/1975 | May | 123/191 S |
| 3,915,134 | 10/1975 | Young et al. | 123/119 A |
| 3,986,351 | 10/1976 | Woods et al. | 123/119 A |
| 3,999,532 | 12/1976 | Kornhauser | 123/191 S |
| 4,038,952 | 8/1977 | Nagano | 123/32 S P |
| 4,038,959 | 8/1977 | Takizawa et al. | 123/191 S |
| 4,041,916 | 8/1977 | Iida et al. | 123/119 A |
| 4,116,191 | 9/1978 | Yanagihara et al. | 123/32 SP |
| 4,116,234 | 9/1978 | Yanagihara et al. | 123/32 SP |

OTHER PUBLICATIONS

Withrow, Jr. et al., Engines for Tomorrow's Passenger Cars, Aug. 1976, p. 5 (Society of Automotive Engineers).
Noguchi et al., Toyota Lean Burn Engine, Feb. 1977, (Automobil—Industrie).

Primary Examiner—Charles J. Myhre
Assistant Examiner—M. Moy
Attorney, Agent, or Firm—Stevens, Davis, Miller & Mosher

[57] ABSTRACT

Disclosed is an internal combustion engine having no intake throttle valve and comprising a main chamber and an auxiliary chamber which are interconnected with each other via a connecting passage. An annular raised portion is formed on the inner wall of the auxiliary chamber, and the auxiliary chamber is divided into a first auxiliary chamber and a second auxiliary chamber by the annular raised portion. The connecting passage is tangentially connected to the inner wall of the second auxiliary chamber. The nozzle of a fuel injector is disposed in the auxiliary chamber and is directed to the recess which is formed in the second auxiliary chamber beneath the annular raised portion at a position located opposite to the inner wall to which the connecting passage is tangentially connected with respect to the axis of the auxiliary chamber. The spark gap of a spark plug is located in the recess of the second auxiliary chamber. The sum of the volumes of the auxiliary chamber and the connecting passage is more than 80 percent of the sum of the volumes of the auxiliary chamber, the connecting passage and the main chamber when said piston reaches the top dead center position. The exhaust gas is recirculated into the intake system of the engine so that the exhaust gas recirculating rate becomes 30 through 40 percent. The amount of the fuel injected from the injector is so regulated that the total air-fuel ratio is increased to within 30 through 100:1 in accordance with a decrease in the level of the load of the engine. The ignition timing is advanced to within the range of 15 through 50 degrees before the top dead center position of the compression stroke in accordance with a decrease in the level of the load of the engine.

6 Claims, 8 Drawing Figures

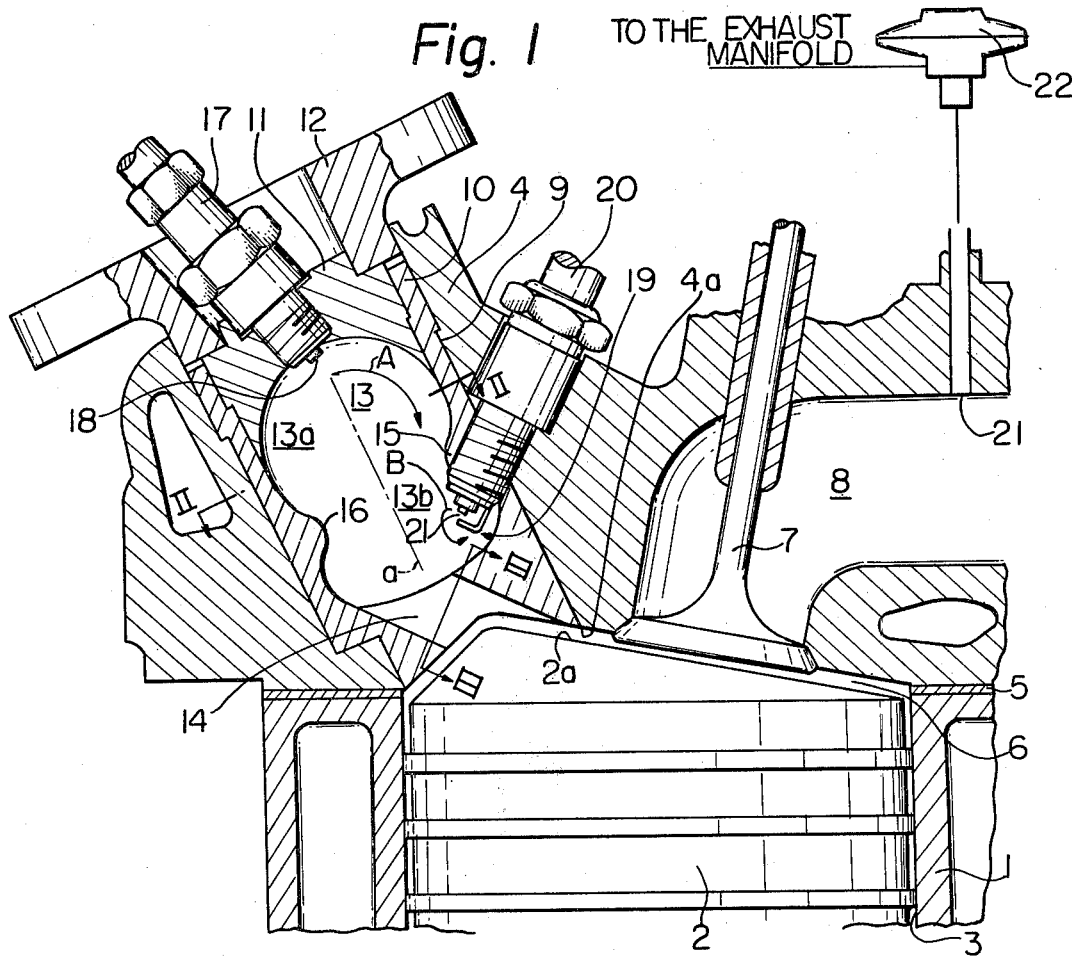
Fig. 1
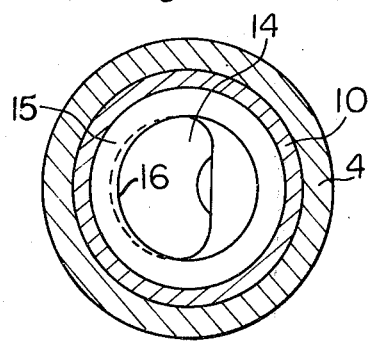
Fig. 2
Fig. 3

TO THE EXHAUST MANIFOLD

INTERNAL COMBUSTION ENGINE WITH AN AUXILIARY COMBUSTION CHAMBER

DESCRIPTION OF THE INVENTION

The present invention relates to an internal combustion engine provided with an auxiliary chamber.

There has been proposed an internal combustion engine comprising a main chamber and an auxiliary chamber which are interconnected with each other via a connecting passage. In this engine, the auxiliary chamber has a volume of approximately 80 percent relative to the total volume of the combustion chamber and is divided into a first auxiliary chamber and a second auxiliary chamber by an annular raised portion defining a circular restricted opening. The connecting passage is tangentially connected to the inner wall of the second auxiliary chamber located as a position near the main chamber. A recess is formed on the inner wall of the second auxiliary chamber beneath the annular raised portion at a position located opposite to the inner wall to which the connecting passage is tangentially connected with respect to the axis of the auxiliary chamber. The spark gap of a spark plug is located in the recess. The fuel injector is disposed in the auxiliary chamber so as to form a rich air-fuel mixture in the recess.

In operation, at the time of the intake stroke, air is introduced into the main chamber. Then, at the time of the compression stroke, the air is forced into the auxiliary chamber via the connecting passage. Since the connecting passage is tangentially connected to the inner wall of the second auxiliary chamber, the air causes a swirl motion in the auxiliary chamber. Then, fuel is injected from the fuel injector towards the swirling air and, as a result, the combustible mixture thus formed is ignited by the spark plug. After this, the burned gas is injected into the main chamber via the connecting passage.

In an internal combustion engine of this type, a combustible mixture is formed by the fuel which is injected from the injector into the auxiliary chamber at the time of the compression stroke, and the air-fuel ratio of the combustible mixture is gradually reduced as the amount of air forced into the auxiliary chamber from the main chamber is increased at the time of the compression stroke. Therefore, in this engine, the ignition timing is so set that the ignition is carried out when an air-fuel ratio of the combustible mixture located in the recess in which the spark plug is positioned becomes within the range of the air-fuel ratio wherein the combustible mixture can be ignited.

In an internal combustion engine of the above-mentioned type, the timing wherein an air-fuel mixture of the combustible mixture in the recess becomes within the above-mentioned range of the air-fuel ratio is advanced as the total air-fuel ratio (the ratio of the amount of air introduced into the main chamber to the amount of fuel injected from the fuel injector) is increased. Consequently, it is necessary to advance the ignition timing as the total air-fuel ratio is increased. However, in this engine, when the total air-fuel ratio is increased and, thus, the ignition timing is advanced, since the combustion is completed in an excessively short time, the thermal efficiency and the torque are reduced. Consequently, in a conventional engine, it is impossible to advance the ignition timing and, accordingly, it is impossible to increase the total air-fuel ratio. That is, in a conventional engine, when the engine is operating under a light load, it is necessary to throttle the air introduced into the main chamber by means of the intake throttle valve and, in addition, set the amount of the fuel injected from the fuel injector so that the total air-fuel ratio is about 30:1. At the same time, it is necessary to set the ignition timing so that the ignition is carried out when the piston reaches a point near the top dead center positions.

As mentioned above, in such a conventional engine, since it is necessary to throttle the air introduced into the main chamber when the engine is operating under a light load, a great pumping loss is caused by the throttling operation and, as a result, there occurs a problem in that the fuel consumption is increased. In addition, in such a conventional engine, while the amount of production of the unburned HC is small, there is a problem in that an extremely large amount of $NO_x$ is produced.

An object of the present invention is to provide an internal combustion engine equipped with an auxiliary chamber in which the total air-fuel ratio is greatly increased and, in addition, it is not necessary to provide an intake throttle valve in such a manner that the ignition timing can be advanced by recirculating a large amount of the exhaust gas into the intake system of the engine so as to control the combustion speed of the combustible mixture.

According to the present invention, there is provided an internal combustion engine provided with an intake passage having no throttle valve therein, said engine comprising: a cylinder block having a cylinder bore therein; a cylinder head having a cavity therein and mounted on said cylinder block, said cavity having an inner wall which defines an auxiliary chamber with an axis; a piston reciprocally movable in said cylinder bore, said piston and said cylinder head forming a main chamber therebetween; an intake valve movably mounted on said cylinder head for leading air into said main chamber via the intake passage; an exhaust valve movably mounted on said cylinder head for discharging exhaust gas into the atmosphere; a raised portion formed on the inner wall of said auxiliary chamber and defining a restricted opening, said raised portion dividing said auxiliary chamber into a first chamber and a second chamber which are arranged in tandem along the axis of said auxiliary chamber and forming a recess in said second chamber beneath said raised portion; a connecting passage formed in said cylinder head and communicating said main chamber with said auxiliary chamber, said connecting passage being arranged to be tangentially connected to the inner wall of said second chamber for creating a swirl motion of the air at the time of the compression stroke, the sum of the volumes of said auxiliary chamber and the connecting passage being more than 80 percent of the sum of the volumes of the auxiliary chamber, the connecting passage and said main chamber when said piston reaches the top dead center position; means for recirculating a large amount of the exhaust gas into the intake passage; fuel injecting means having an injecting nozzle disposed in said auxiliary chamber and directed to said recess located opposite to the inner wall to which said connecting passage is tangentially connected with respect to the axis of said auxiliary chamber for forming a combustible mixture having the total air-fuel ratio which is increased within the range of 30 through 100:1 in accordance with a decrease in the level of the load of the engine, and; ignition means having a spark plug with a spark plug gap located in said recess for advancing the ignition timing within the range of 15 through 50 degrees before the top dead center position in accordance with a decrease in the level of the load of the engine.

The present invention may be more fully understood from the description of preferred embodiments of the invention set forth below, together with the accompanying drawings.

BRIEF DESCRIPTION OF THE DRAWINGS

In the drawings:

FIG. 1 is a cross-sectional side view of an embodiment of an internal combustion engine according to the present invention;

FIG. 2 is a cross-sectional view taken along the line II—II in FIG. 1;

FIG. 3 is a cross-sectional view taken along the line III—III in FIG. 1;

DESCRIPTION OF PREFERRED EMBODIMENTS

Figure 4:
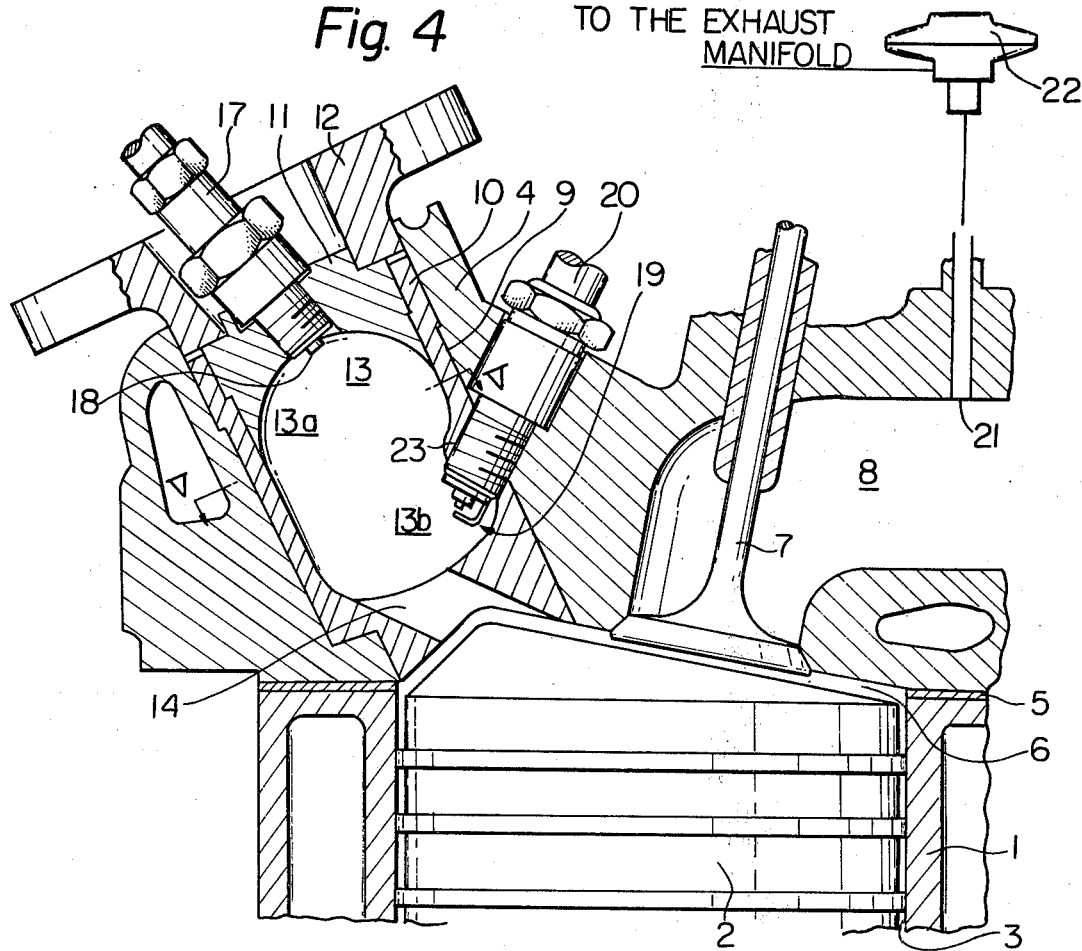
FIG. 4 is a cross-sectional side view of an alternative embodiment according to the present invention.

Referring to FIG. 1, 1 designates a cylinder block, 2 a piston reciprocally movable in a cylinder bore 3 and having a convex top surface 2a, 4 a cylinder head fixed onto the cylinder block 1 via a gasket 5 and having a concave inner wall 4a, 6 a main chamber, 7 an intake valve, and 8 an intake port. In addition, an exhaust valve (not shown) is movable mounted on the cylinder head 4. A hole 9 having a circular cross-section is formed in the cylinder head 4, and an auxiliary chamber component 10 is fitted into the hole 9. In addition, another auxiliary chamber component 11 is fitted into the upper portion of the auxiliary chamber component 10. The auxiliary chamber components 10 and 11 are rigidly fixed onto the cylinder head 4 by a fixing plate 12 fixed onto the cylinder head 4 by means of bolts (not shown). An auxiliary chamber 13 is formed in the auxiliary chamber components 10 and 11 and is connected to the main chamber 6 via a connecting passage 14 formed in the auxiliary chamber component 10. In addition, the sum of the volumes of the auxiliary chamber 13 and the connecting passage 14 is set so as to be more than 80 percent of the sum of the volumes of the auxiliary chamber 13, the connecting passage 14 and the main chamber 6 at the time the piston 2 is positioned at the top dead center position as shown in FIG. 1.

The shape of the inner wall of the auxiliary chamber 13 is formed in a symmetrical surface around the axis a of the auxiliary chamber 13. An annular raised portion 15 presenting a smoothly curved line in a longitudinal cross-section as shown in FIG. 1 is formed on the inner wall of the auxiliary chamber 13 and defines a circular restricted opening 16. The auxiliary chamber 13 is divided into a first auxiliary chamber 13a and a second auxiliary chamber 13b by an annular raised portion 15. The shape of the inner wall of the first auxiliary chamber 13a is spherical or approximately ellipsoid. On the other hand, the shape of the inner wall of the second auxiliary chamber 13b is an ellipsoid. The upper end of the connecting passage 14 is tangentially connected to the inner wall of the second auxiliary chamber 13b, while the lower end of the connecting passage 14 opens into the periphery of the main chamber 6. A nozzle 18 of a fuel injector 17 is disposed at the apex of the first auxiliary chamber 13a and is arranged to be directed to a recess 19 which is formed on the inner wall of the secondary auxiliary chamber 13b beneath the annular raised portion 15 at a position located opposite to the inner wall to which the connecting passage 14 is tangentially connected with respect to the axis a of the auxiliary chamber 13. In addition, a spark gap 21 of a spark plug 20 is located in the recess 19 in the vicinity of the opening of the connecting passage 14. Since the engine shown in FIG. 1 is provided with no throttle valve in the intake port 8, the intake port 8 is directly connected to an air cleaner (not shown) or is connected to the air cleaner via a carburetor (not shown) forming a lean air-fuel mixture and having no throttle valve. Therefore, in these engines, the regulation of the load of the engine is carried out by regulating the amount of fuel injected from the fuel injector 17. A recirculated exhaust gas feed port 21 opens into the intake port 8 and is connected to the exhaust manifold (not shown) of the engine via a recirculated exhaust gas flow control valve 22. This recirculated exhaust gas flow control valve 22 is so set that the exhaust gas, the amount of which is 30 through 40 percent relative to the amount of the gas introduced into the cylinder of the engine, is recirculated into the intake port 8.

In operation, at the time of the intake stroke, a suction gas such as air or a lean air-fuel mixture, which gas contains a large amount of the recirculated exhaust gas therein, is introduced into the main chamber 6 via the intake valve 7. Then, at the time of the compression stroke, the suction gas introduced into the main chamber 6 is forced into the auxiliary chamber 13 via the connecting passage 14. The suction gas introduced into the auxiliary chamber 13 passes through the second auxiliary chamber 13b and then enters into the first auxiliary chamber 13a, thus causing a strong swirl motion, as shown by the arrow A, in the first auxiliary chamber 13a. On the other hand, a swirl motion, as shown by the arrow B, is caused in the recess 19 by the strong swirl motion A. The fuel injecting operation of the fuel injector 17 is started when the piston reaches approximately bottom dead center position at the beginning of the compression stroke, and said fuel injecting operation is completed when the piston reaches a point corresponding to approximately 120 degrees before top dead center position. A large part of the fuel injected from the fuel injector 17 towards the recess 19 remains in the recess 19, and the remaining small part of the fuel enters into the first auxiliary chamber 13a via the second auxiliary chamber 13b. After this, a part of the fuel introduced into the first auxiliary chamber 13a is again returned to the second auxiliary chamber 13b. As stated previously, a swirl motion B is created in the recess 19. Consequently, the vaporization of the liquid fuel adhering onto the inner wall of the recess 19 is promoted by the swirl motion B and by the heat of the inner wall of the recess 19, and as a result, a rich air-fuel mixture is formed in the recess 19. Then, the rich air-fuel mixture formed in the recess 19 is ignited by the spark plug 20. A small part of the flame of the rich air-fuel mixture thus ignited is injected into the main chamber 6 via the connecting passage 14, while the remaining large part of the flame propagates into the first auxiliary chamber 13a via the restricted opening 16. An extremely lean air-fuel mixture formed in the first auxiliary chamber 13a swirls in the first auxiliary chamber 13a together with the strong swirl motion A created in the first auxiliary chamber 13a. The combustion of the lean air-fuel mixture in the first auxiliary chamber 13a is controlled by a large amount of the recirculated exhaust gas, and the lean air-fuel mixture in the first auxiliary chamber 13a is almost completely burned.

Figure 6:
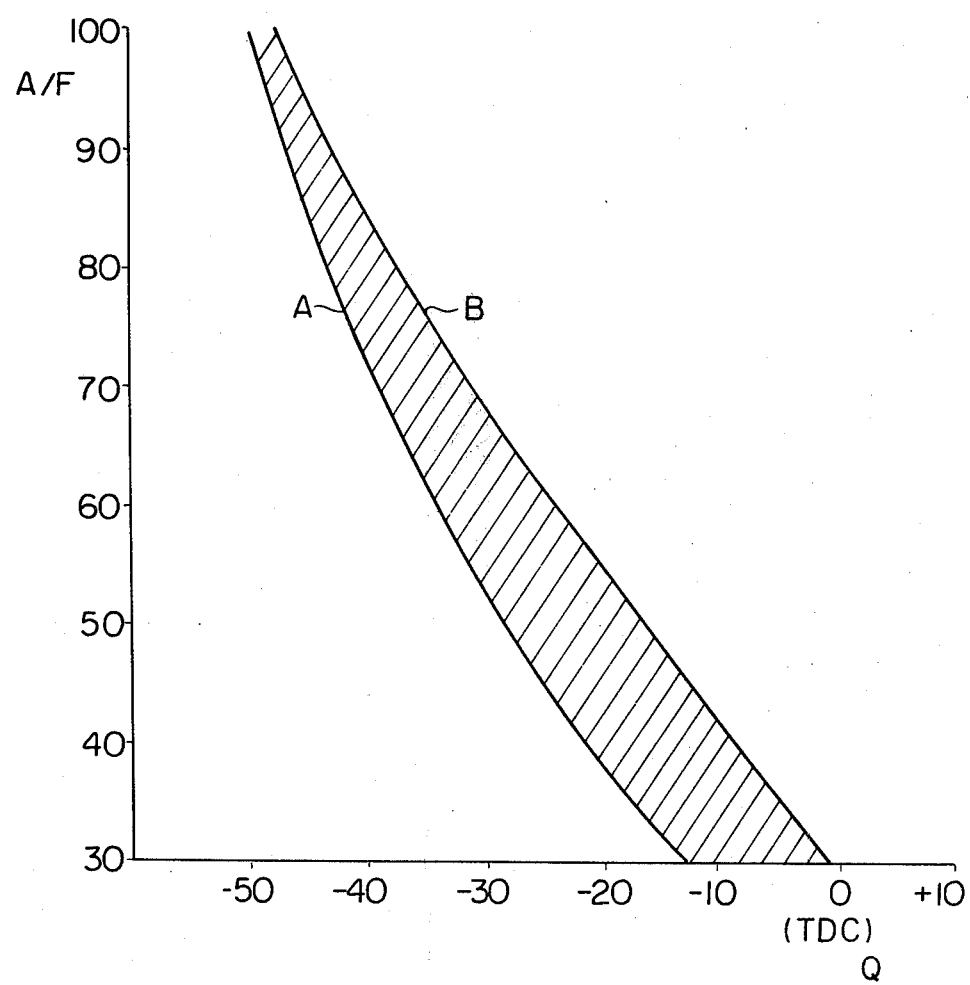
FIG. 6 is a graph showing the relationship between the total air-fuel ratio and the ignition timing.

FIG. 6 shows the relationship between the total air-fuel ratio and the ignition timing in an engine according to the present invention. In FIG. 6, the ordinate A/F indicates the total air-fuel ratio, and the abscissa Q indicates the ignition timing. In addition, in FIG. 6, the curved line A indicates the limit of the rich side of the total air-fuel ratio wherein the ignition can be carried out, and the curved line B indicates the limit of the lean side wherein the ignition can be carried out. That is, the region indicated by the hatching in FIG. 6 shows the range wherein the ignition can be carried out in the case wherein the exhaust gas, the amount of which is 30 through 40 percent relative to an amount of the gas introduced into the cylinder of the engine, is recirculated in the intake port 8.

In an engine according to the present invention, the ignition timing is so set that the ignition is carried out when the total air-fuel ratio becomes an air-fuel ratio on the rich side within the range shown by the hatching in FIG. 6. That is, when the engine is operated under a light load, wherein the amount of fuel injected from the fuel injector is so set that the total air-fuel ratio becomes about 100:1, the ignition timing is set at approximately 50 degrees before the top dead center position on the compression stroke. On the other hand, when the engine is operated under a heavy load, wherein the amount of fuel injected from the fuel injector is so set that the total air-fuel ratio becomes about 30:1, the ignition timing is set at approximately 15 degrees before the top dead center position on the compression stroke. For example, in the case wherein a combustible mixture is ignited at 50 degrees before the top dead center position on the compression stroke when the engine is operating under a light load, since the ignition is carried out when the total air-fuel ratio becomes an air-fuel ratio on the rich side within the range shown by the hatching in FIG. 6, as mentioned above, a stable ignition can be obtained. In addition, even if the ignition timing is greatly advanced, that is, the ignition timing is set at 50 degrees before the top dead center position on the compression stroke, since the combustion speed of the combustible mixture thus ignited is suppressed by a large amount of the recirculated exhaust gas, the combustion speed is reduced. As a result of this, the reductions in the thermal efficiency and the torque, which are caused when the conventional engine is operated under a light load, can be prevented. In addition, since the ignition timing is greatly advanced and the combustion speed is reduced, the length of time of the combustion caused in the auxiliary chamber 13 becomes long. As a result of this, since the inner wall of the auxiliary chamber 13 is exposed to the combustion gas having a high temperature for a long time and, thus, the temperature of the inner wall of the auxiliary chamber 13 becomes high, the quench layer consisting of the unburned HC and formed on the inner wall of the auxiliary chamber 13 is thinned to a maximum possible extent. Consequently, the amount of the unburned HC produced in the auxiliary chamber 13 is considerably reduced. In addition, since the burned gas is injected into the main chamber 6, there is no danger that unburned HC will be produced in the main chamber 6. Furthermore, the recirculation of a large amount of the exhaust gas causes a reduction in the amount of $NO_x$ produced in the combustion chamber.

Figure 7:
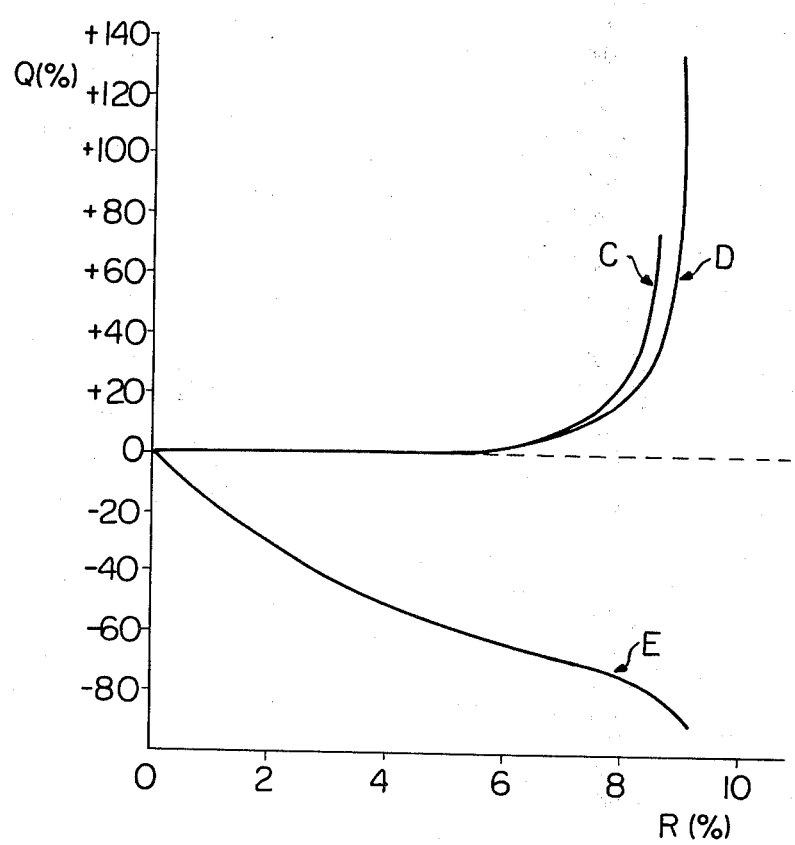
FIG. 7 is a graph showing the relationship between the rate of reduction in the fuel consumption and the amount of HC, CO and $NO_x$ produced in the combustion chamber.

FIG. 7 shows the relationship between the rate of reduction in the fuel consumption and the amount of harmful components produced in the combustion chamber. In FIG. 7, the abscissa R indicates the ratio of the fuel consumption in an engine according to the present invention to the fuel consumption in a conventional engine, and the ordinate Q indicates the ratio of the amount of harmful HC, CO and $NO_x$ components in an engine according to the present invention to that in a conventional engine. In addition, in FIG. 7, the curved lines C, D and E indicate CO, HC and $NO_x$, respectively. Since an engine according to the present invention does not need to be provided with a suction throttle valve and, in addition, a super lean air-fuel mixture can be used, the fuel consumption is considerably reduced and, at the same time, the amount of $NO_x$ produced in the combustion chamber is considerably reduced while maintaining the amount of HC and CO produced in the combustion chamber at the same level as that in a conventional engine as shown in FIG. 7.

Figure 8:
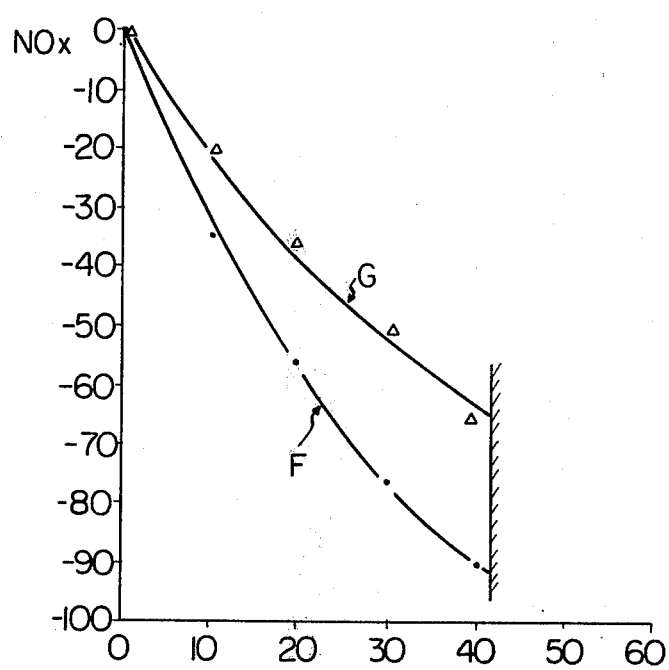
FIG. 8 is a graph showing the relationship between the exhaust gas recirculating rate and the rate of the reduction of the amount of $NO_x$ produced in the combustion chamber.

FIG. 8 shows the relationship between the rate of reduction in the amount of $NO_x$ produced in the combustion chamber and the exhaust gas recirculating rate, which is defined as the ratio of the amount of recirculated exhaust gas to the amount of gas introduced into the cylinder of the engine. In FIG. 8, the curved line F indicates the rate of reduction $NO_x$ in the case wherein the fuel injected from the fuel injector is almost equally divided into the first auxiliary chamber 13a and the second auxiliary chamber 13b. On the other hand, the curved line G indicates the rate of reduction of $NO_x$ in the case wherein the amount of fuel injected into the first auxiliary chamber 13a is larger than that of the fuel injected into the second auxiliary chamber 13b. In addition, the range indicated by the hatching in FIG. 8 shows the range wherein a misfire is caused. From FIG. 8, it is understood that, when the fuel is almost equally divided into the first auxiliary chamber 13a and the second auxiliary chamber 13b, the rate of reduction of $NO_x$ is increased. Since a super lean air-fuel mixture is used in an engine according to the present invention, the amount of $CO_2$ contained in the exhaust gas is less than that in a conventional engine and, as a result, a large amount of the exhaust gas can be recirculated into the intake system of the engine. Consequently, a large amount of the exhaust gas can be recirculated into the intake system so that the exhaust gas recirculating rate becomes 30 through 40 percent without causing a misfire as shown in FIG. 8 and, as a result, the amount of $NO_x$ produced in the combustion chamber is considerably reduced.

Figure 5:
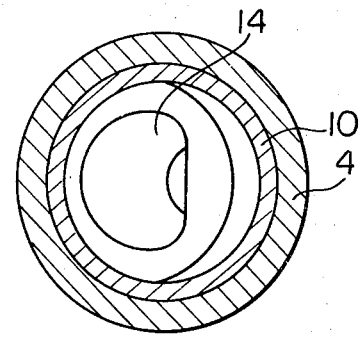
FIG. 5 is a cross-sectional view taken along the line V—V in FIG. 4.

FIG. 4 shows an alternative embodiment according to the present invention. Referring to FIG. 4, a raised portion 23 is formed on the inner wall of the auxiliary chamber 13, which is located at a position opposite to the inner wall to which the connecting passage 14 is tangentially connected. As is shown in FIG. 5, the raised portion 23 is formed along approximately half of the cylindrical inner wall of the auxiliary chamber 13. Since the operation of this embodiment is the same as that of the embodiment shown in FIG. 1, the description of the operation is omitted.

According to the present invention, since a super lean air-fuel mixture can be used without throttling the air introduced into the cylinder of the engine by lowering the combustion speed, the fuel consumption can be improved and, at the same time, the amount of $NO_x$ produced in the combustion chamber can be considerably reduced. According to experiments conducted by the inventor, it has been proven that it is possible to reduce the fuel consumption of a conventional engine by approximately nine percent.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine provided with an intake passage having no throttle valve therein, said engine comprising:
    a cylinder block having a cylinder bore therein;
    a cylinder head having a cavity therein and mounted on said cylinder block, said cavity having an inner wall which defines an auxiliary chamber with an axis;
    a piston reciprocally movable in said cylinder bore, said piston and said cylinder head forming a main chamber therebetween;
    an intake valve movably mounted on said cylinder head for leading air into said main chamber via the intake passage;
    an exhaust valve movably mounted on said cylinder head for discharging exhaust gas into the atmosphere;
    a raised portion formed on the inner wall of said auxiliary chamber and defining a restricted opening, said raised portion dividing said auxiliary chamber into a first chamber and a second chamber which are arranged in tandem along the axis of said auxiliary chamber and forming a recess in said second chamber beneath said raised portion;
    a connecting passage formed in said cylinder head and communicating said main chamber with said auxiliary chamber, said connecting passage being arranged to be tangentially connected to the inner wall of said second chamber for creating a swirl motion of the air at the time of the compression stroke, the sum of the volumes of said auxiliary chamber and the connecting passage being more than 80 percent of the sum of the volumes of the auxiliary chamber, the connecting passage and said main chamber when said piston reaches the top dead center position;
    means for recirculating a large amount of the exhaust gas into the intake passage;
    fuel injecting means having an injecting nozzle disposed in the first chamber of said auxiliary chamber and directed to said recess located opposite to the inner wall to which said connecting passage is tangentially connected with respect to the axis of said auxiliary chamber for forming a combustible mixture having the total air-fuel ratio which is increased within the range of 30 through 100:1 in accordance with a decrease in the level of the load of the engine; and
    ignition means having a spark plug with a spark gap located in said recess for advancing the ignition timing within the range of 15 through 50 degrees before the top dead center position in accordance with a decrease in the level of the load of the engine.

2. An internal combustion engine as claimed in claim 1, wherein the exhaust gas recirculating rate is in the range of 30 through 40 percent.

3. An internal combustion engine as claimed in claim 1, wherein the fuel injected from the injecting nozzle is almost equally divided into the first chamber and the second chamber.

4. An internal combustion engine as claimed in claim 1, wherein said engine further comprises a carburetor for creating a lean air-fuel mixture in the intake passage.

5. An internal combustion engine as claimed in claim 1, wherein:
    said raised portion is defined by an inwardly extending projection on the inner wall of the auxiliary combustion chamber and extending continuously around substantially the entire periphery of said inner wall.

6. An internal combustion engine as claimed in claim 1, wherein:
    said raised portion is defined by an inwardly extending projection on the inner wall of the auxiliary combustion chamber and extending continuously around substantially half the periphery of said inner wall.

* * * * *